(12) United States Patent
Chadalavada

(10) Patent No.: US 7,426,571 B2
(45) Date of Patent: Sep. 16, 2008

(54) PROVIDING FILES TO AN INFORMATION HANDLING SYSTEM USING A REMOTE ACCESS CONTROLLER

(75) Inventor: Kalyana Krishna Chadalavada, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 814 days.

(21) Appl. No.: 11/031,581

(22) Filed: Jan. 6, 2005

(65) Prior Publication Data

US 2006/0150014 A1 Jul. 6, 2006

(51) Int. Cl.
*G06F 15/16* (2006.01)

(52) U.S. Cl. .................. 709/235; 709/217; 709/220; 709/223; 709/234; 709/249; 709/251; 717/120; 717/168; 717/174

(58) Field of Classification Search .............. 709/217, 709/220, 223, 234, 235, 249, 251; 717/120, 717/168, 174

See application file for complete search history.

(56) References Cited

U.S. PATENT DOCUMENTS

| | | | |
|---|---|---|---|
| 5,768,539 A * | 6/1998 | Metz et al. | 709/249 |
| 6,199,204 B1 | 3/2001 | Donohue | 717/11 |
| 6,202,207 B1 | 3/2001 | Donohue | 717/0 |
| 6,687,901 B1 | 2/2004 | Imamatsu | 717/173 |
| 6,760,908 B2 | 7/2004 | Ren | 717/173 |
| 7,080,284 B1 * | 7/2006 | Zeevi et al. | 714/31 |
| 2006/0064419 A1 * | 3/2006 | Pan et al. | 707/10 |
| 2006/0190532 A1 * | 8/2006 | Chadalavada | 709/203 |

* cited by examiner

*Primary Examiner*—Michael Won
(74) *Attorney, Agent, or Firm*—Baker Botts L.L.P.

(57) ABSTRACT

An information handling system that receives operational communications over a primary communications controller may receive files to be installed in the information handling system via a remote access controller. Files received using the remote access controller may not require use of the primary processor of the information handling system, and can be staged in the information handling system for later installation by the primary processor.

12 Claims, 2 Drawing Sheets

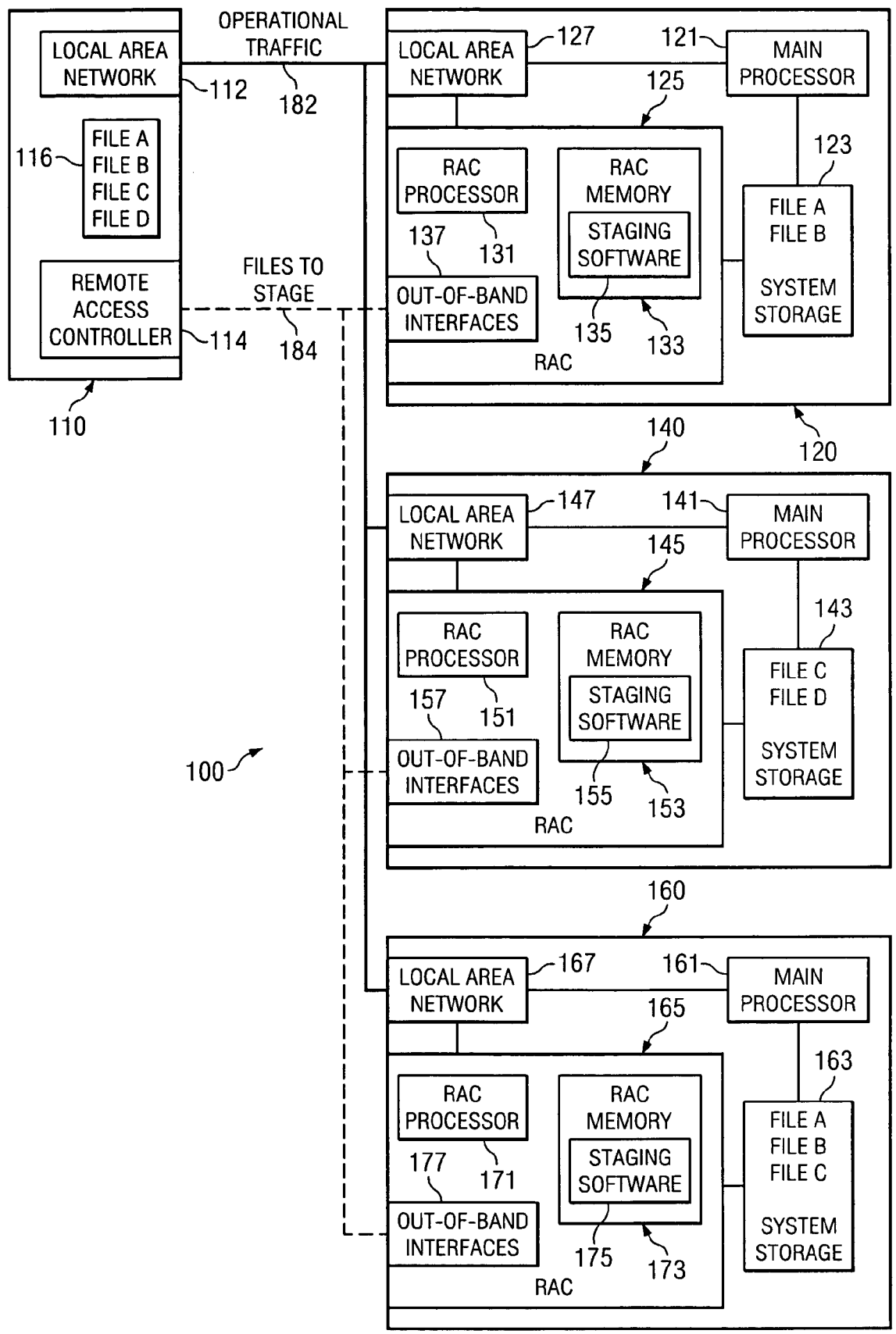

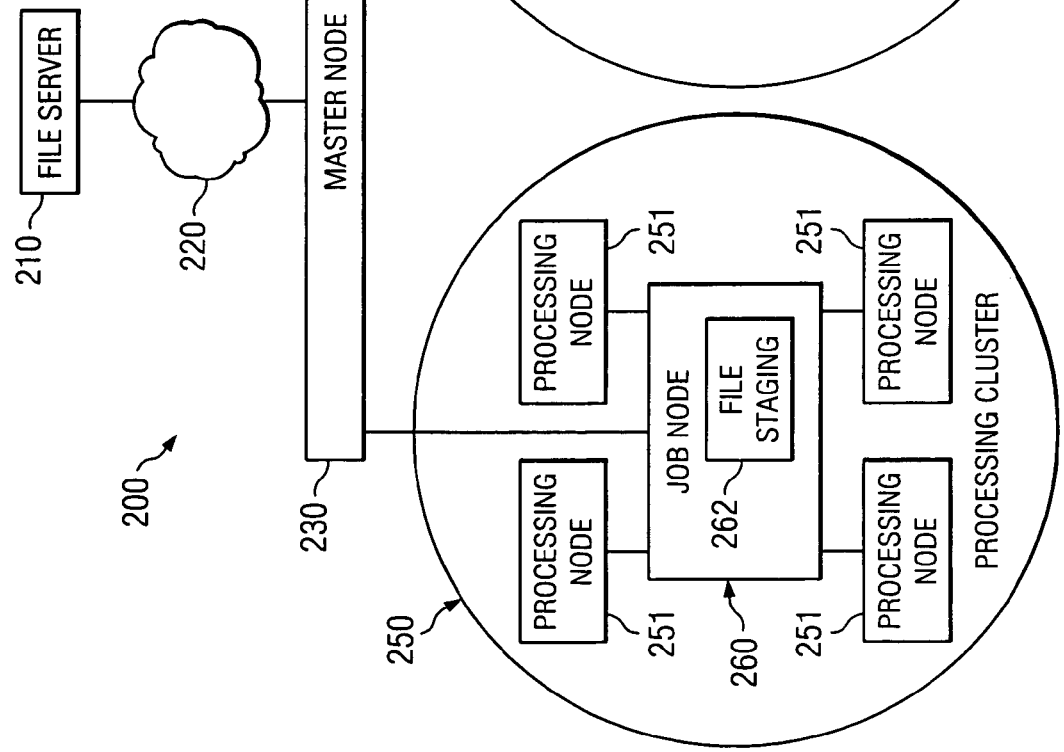
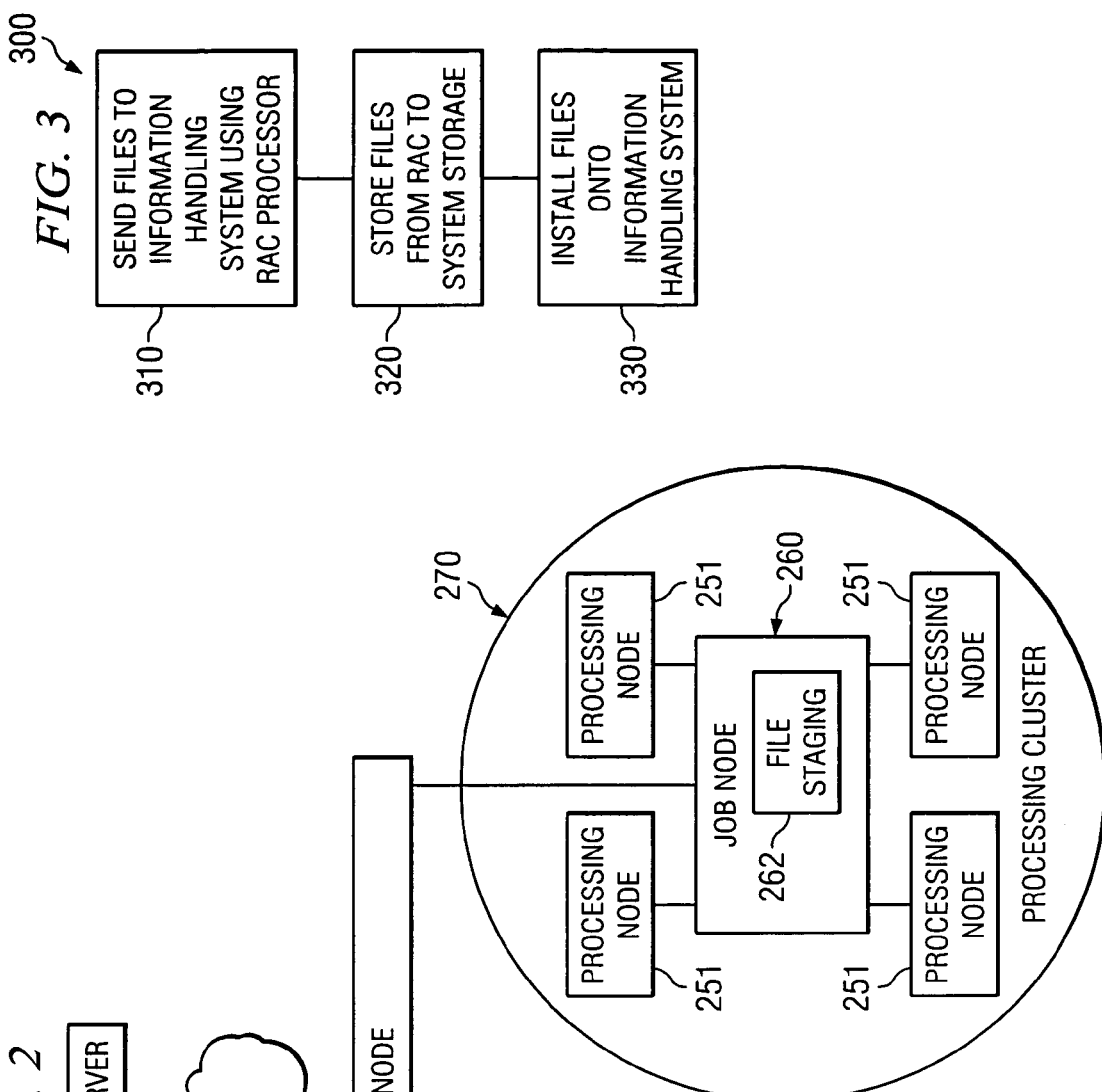

PROVIDING FILES TO AN INFORMATION HANDLING SYSTEM USING A REMOTE ACCESS CONTROLLER

TECHNICAL FIELD

This invention relates generally to transferring files to an information handling system, and more particularly to transferring files to an information handling system using a remote access controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often, one or more of such information handling systems are connected to form a communications network. Updating software on one or more of the networked information handling systems using conventional methods may require installing software packages manually at individual information handling systems using installation disks, or delivering installation files over the same communication channel used for operational communications. Thus, installation of software packages or upgrades may consume part of the bandwidth that could otherwise be used for operational tasks. Furthermore, some of these methods may involve removing one or more of the networked information handling systems from operation while transferring files required for software maintenance or upgrades, negatively impacting system or network performance.

SUMMARY

In accordance with teachings of the present disclosure, a method, system, and device are described for transferring files to an information handling system using a remote access controller. According to at least one embodiment, an information handling system receives operational communications using a primary communications controller, and receives a file to be installed in the information handling system using a remote access controller (RAC). By receiving operational communications using a primary communications controller and files to be installed using a remote access controller, various methods provide for reduced traffic over a network channel used to transmit operational communications between information handling systems. In some cases, reduced loading of a central processor or group of processors can be achieved.

It should be appreciated that, as used herein, the term "operational communications" is sometimes used to refer to general communication traffic, for example messages, commands, status requests, data transfers, file transfers, and the like, occurring during execution of an assigned task. So, for example, a request by one information handling system for a second information handling system to transfer specified data files to the first information handling system under control of an operating system (OS), may be referred to as an operational communication. Conversely, transferring files required to update an OS and/or any other application on the information system files to be staged for future use, or installation, and not generally considered to be operational communications. Thus, transferring a file may be part of an operational communication in one context, and part of a non-operational communication in another context.

In some embodiments a remote access controller receives a file to be installed in an information handling system and stores the file in a local storage medium, for example a random access memory (RAM), a magnetic disk drive, an optical drive, a tape drive, or another suitable storage medium. The storage medium may be accessible to both the remote access controller and the primary processor of the information handling system.

In some such embodiments, the file to be installed is received over a communications network different from the communications network used to receive operational communications. So, for example, operational communications may be received over a primary channel of a local area network, and the file to be installed may be received over an out-of-band communications channel, e.g. a communications channel using the same physical medium but a different transmission frequency. Furthermore, a secondary processor on the remote access controller may be used to receive the file to be installed, while a main processor of the information handling system is used to install the file later.

Another embodiment of the present disclosure provides an information handling system that comprises a system processor and memory, an operating system, a communications controller to receive operational communications, and a remote access controller (RAC) to receive a file to be installed in the information handling system. The RAC receives the file independent of the system processor. In some embodiments, the information handling system includes a random access memory, a disk drive, or some other volatile or non-volatile storage medium. The communications controller and the RAC may each include separate network controllers, coupled to different communication networks.

In yet another embodiment of the present disclosure, a RAC includes a processor, associated memory, and at least one out-of-band communications interface. The RAC also includes a program of instructions that includes at least one instruction to receive, via an out-of-band communications interface, a file to be staged for subsequent installation. The RAC may be connected to an information handling system that includes a storage medium, and the program of instructions may include at least one instruction to store the file in that storage medium. In at least one embodiment, the file may be received by the remote access controller even if a primary processor of the information handling system to which the remote access controller is coupled is currently inoperational. At least one such embodiment also includes multiple out-of-band communications interfaces.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a block diagram illustrating how files can be transferred from a server or other information handling system to multiple information handling systems via an out-of-band communication channel according to an embodiment of the present disclosure.

FIG. 2 is a block diagram illustrating a high performance computing cluster (HPCC) that stages files to be distributed to processing nodes via a remote access controller, according to an embodiment of the present disclosure.

FIG. 3 is a flow diagram illustrating a method according to an embodiment of the present disclosure.

DETAILED DESCRIPTION

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a network 100 of information handling systems will be discussed according to an embodiment of the present disclosure. Network 100 includes information handling systems 110, 120, 140, and 160. Information handling systems 110, 120, 140, and 160 may be connected together for communication using any of various network configurations. For example, information handling system 110 may be a server used to remotely manage information handling systems 120, 140, and 160. Alternatively, information handling systems 110, 120, 140, and 160 may be connected in a peer-to-peer configuration, or in any other suitable configuration.

The embodiment illustrated of FIG. 1 shows information handling system 110 including files 116 to be installed on respective information handling systems 120, 140, or 160. For example, File A and File B in files 116 are to be delivered to information handling system 120 for subsequent installation. Likewise, Files C and D are to be delivered to information handling system 140, and Files A, B and C are to be delivered to information handling system 160.

Each of the information handling systems 110, 120, 140, and 160 include respective local area network controllers 112, 127, 147, or 167, and respective remote access controllers 114, 125, 145, and 165. Local area network controllers 112, 127, 147, and 167 are connected via communications channel 182 and are generally used to carry operational traffic between information handling systems 110, 120, 140, and 160. Remote access controllers 114, 125, 145, and 165 are connected via communications channel 184, and are generally used to provide non-operational traffic, including, but not limited to, intelligent platform management interface(IPMI) notifications, various system configuration or control signals, as well as software or other files, e.g. files 116, which are to be delivered to information handling systems 120, 140, or 160 for later installation.

It should be appreciated that although communications channel 182 and communications channel 184 are illustrated as being separate and distinct communications channels, other embodiments can be implemented in which files to be staged in individual information handling systems 120, 140, and 160 are provided to remote access cards 125, 145 and 165 via local area network controllers 127, 147, and 167, respectively. In some such embodiments, advantages pertaining to conserved bandwidth on communications channel 182 may be decreased, but operational efficiencies can still be realized by using the processor included each of the remote access controllers to stage the files for later installation, rather than requiring the files to be staged using main processors included in each of the information handling systems.

Remote access controller 125 includes RAC processor 131, RAC memory 133, and out-of-band interfaces 137. RAC memory 133 includes staging software 135, which may be stored in RAC memory 133 and executed by RAC processor 131 to cause RAC 125 to receive Files A and B to be staged in system storage 123. Files A and B may be saved in system storage 123 using RAC 125, may later be installed into information handling system 120 using main processor 121, or otherwise, as desired.

Out-of-band interfaces 137 may include, but are not limited to, various serial interfaces, local area network interfaces, modulator-demodulators (modems), or the like. In at least one embodiment, out-of-band interfaces 137 include a virtual terminal (VT-100) interface, a network interface, a Peripheral Component Interconnect (PCI) interface, an intelligent platform management bus (IPMB) interface, and an Ethernet or other network interface controller. Out-of-band interfaces 137 may include a local area network connector that is connected to the same physical communications channel as local area network controller 127.

RAC 145 includes RAC processor 151, RAC memory 153, which includes staging software 155, and out-of-band interfaces 157. RAC 165 includes RAC processor 171, RAC memory 173, staging software 175, and out-of-band interfaces 177. Using information handling system 140 as an example, consider the situation in which software update Files C and D are to be transferred from information handling system 110 for later installation on information handling system 140. The file transfer may be performed as part of a normal maintenance program, in which updated versions of software, drivers, and the like are loaded periodically, or otherwise, from information handling system 110 to information handling system 140. Alternatively, Files C and D may be provided to system storage 143 on information handling system 140 in conjunction with hardware upgrades, or the like.

At least one embodiment of the present disclosure transfers Files C and D through remote access controller 114, over communications channel 184, and into one or more of the out-of-band interfaces 157, which are part of RAC 145. RAC 145 receives the files, and may stage them for later installation in information handling system 140 by storing the files in system storage 143, as illustrated.

Alternatively, files may be staged in RAC memory 153, or in other suitable storage accessible to both RAC 145 and main processor 141. In such embodiments, the files may be downloaded into information handling system 140 over communications channel 184 without interfering with the normal operational communications of information handling system 140. Thus, for example, operational traffic on communications channel 182, which is handled primarily by local area network controller 147 and main processor 141, are not interrupted or delayed by transferring files that will be later installed in information handling system 140.

Files A, B, and C may be stored to information handling system 160 in a manner similar to the manner in which Files C and D are stored to information handling system 140. Thus, under control of RAC processor 171, RAC 165 receives Files A, B, and C from information handling system 110 over out-of-band communications channel 184. The files are received at out-of-band interfaces 177, and delivered to system storage 163. Main processor 161 can subsequently install Files A, B, and C, which are held in system storage 163. By staging Files A, B, and C in this manner, information handling system 160 need not be taken out of an operational mode to stage Files A, B, and C. Furthermore, the operational efficiency of information handling system 160 may be maintained by conserving main processor 161 resources until needed for the actual installation of the files.

Referring next to FIG. 2, a network according to an embodiment of the present disclosure is illustrated. Network 200 includes file server 210 connected to master node 230 via a communications network 220, which may include a wide area network like the Internet, a local area network, or other similar network. Master node 230 communicates with processing clusters 250 and 270 to form a high performance computing cluster (HPCC). Processing clusters 250 and 270 each include various processing nodes 251, as well as job nodes 260.

In at least one embodiment, master node 230 serves as an interface between processing clusters 250, 270 and file server 210. Master node 230 is generally assigned to perform a relatively high level task compared to those tasks performed by processing clusters 250 and 270.

Often, processing clusters 250 and 270 are used by master node 230 to perform specific, highly computation-intensive tasks that might require more computing power than available in master node 230 itself. Alternatively, master node 230 may use processing clusters 250 and 270 to perform intermediate-level tasks, and job nodes 260 may assign lower-level processing tasks to one or more of the processing nodes 251. Each processing node 251 may, in turn, represent another processing cluster, or some other form of information handling system or information handling network, as dictated by various operational considerations.

It should be appreciated that although a particular information handling network configuration is illustrated in FIG. 2, those skilled in the art may implement the teachings set forth herein in other network configurations as desired, and the various implementations discussed herein, and their equivalents, are not limited to implementation in the particular illustrated network configuration.

Assuming the illustrated configuration of network 200, and further assuming that master node 230 is used to perform a high level process with processing clusters 250 and 270 being used to perform lower-level, computationally-intensive procedures, consider the following example. Processing nodes 251 may require updated software to perform a task more efficiently, or to perform a particular type of task. Additionally, different processing nodes 251 may require different software if the nodes are to perform different tasks. Thus, if processing cluster 250 is used to perform a different type of calculation than processing cluster 270, different software may be needed by processing nodes 251 in processing cluster 270 than is needed by processing nodes 251 in processing cluster 250.

File server 210 can supply master node 230 with the software updates needed by processing nodes 251 in both clusters 250 and 270. Master node 230, in turn, delivers these software updates to job nodes 260 in both processing clusters. Both job nodes 260 stage the software updates for their respective processing nodes in respective file staging areas 262, which may include hard disks, random access memories, or another suitable storage device.

If, as in some conventional networks, master node 230 transfers the software updates to job nodes 260 over a primary communications channel, then the communications bandwidth between master node 230 and processing clusters 250 and 270 may be at least partially consumed. At least one embodiment of network 200, by contrast, communicates between software updates master node 230 and job nodes 260 via remote access controllers (not illustrated), which does not decrease the bandwidth of the primary communication channels.

Job nodes 260 may store these software updates, or other non-operational files, in staging areas 262, for subsequent transfer to one or more processing nodes 251. This subsequent transfer may also be performed using RACs on job nodes 260 processing nodes 251.

Using an RAC to transfer files, rather than transferring the files using a primary communications controller is described in the following example according to one embodiment of the disclosure. Considering only processing cluster 250 and master node 230 for purposes of this example, assume that master node 230 is using processing cluster 250 to perform data comparisons between a large number of data samples and a table of predetermined threshold limits.

If it is estimated that processing cluster 250 will be finished comparing the current samples against the current threshold values in three hours, efficient practice may dictate that new threshold tables are queued in file staging area 262 prior to the three hour estimated completion time, so that new data samples can be compared against new threshold values. Towards that end, master node 230 can send the new threshold tables to file staging area 262 over a secondary communications channel using RACs (not illustrated) in master node 230 and job node 260. The new threshold tables can be sent at the same time that operational communications are being sent between master node 230 and job node 260, and while operational communications are being sent between job node 260 and processing nodes 251. Because the primary communication controllers are not being used, transferring the new threshold tables does not impact the efficiency of network 200 as much as the efficiency of network 200 would be impacted if operational communications had to be suspended to allow for transfer of the files to a staging area 262.

In some embodiments, the files in file staging area 262 can be provided to processing nodes 251 during normal operations, without interfering with operational communications between job node 260 and processing node 251. In other embodiments, it may be desirable for job node 260 to perform software or other file transfers from job node 260 to the individual processing nodes 251 over a primary communications channel. In some such embodiments, processing cluster 250 may be placed in a maintenance, or non-operational state, long enough for files to be transferred from job node 260 to processing node 251, and for these files to be installed in the respective processing nodes.

In other embodiments, each of the processing nodes 251 may have already received appropriate software and/or other file updates, and processing cluster 250 will enter a maintenance state only long enough for each processing node to install its own, previously received software. After the software or file updates have been installed, processing cluster 250 may be brought back online for use by master node 230.

It should be appreciated that in some embodiments, files transferred via remote access controllers between master node 230 and job node 260, or between job node 260 and processing node 251, may not require installation. Instead, such files can be saved to storage devices and accessed essentially immediately by an operating system or other software.

Referring next to FIG. 3, a method 300 will be discussed according to an embodiment of the present disclosure. In one form, the method begins at 310, where files are sent to an information handling system using an RAC processor. It should be appreciated that an RAC, in many embodiments, includes a second processor, separate from the primary processor used to execute the operating system of an information handling system. Note that the primary processor and/or the RAC processor may actually include more than one physical processor.

By using an RAC with a processor separate from the information handling system's primary processor, at least one embodiment permits file transfers to be handled without impacting the information handling system's primary operational performance. Thus, an operating system or other software being run on a system that includes a remote access controller with a separate processor may be more efficient than an information handling system without a separate RAC processor.

The method proceeds from 310 to 320, where files received using the RAC processor are stored to the system storage of the information handling system. In some embodiments, the RAC may include its own memory or other storage device so that received files can be stored within the remote access controller itself. In some such embodiments, the main system processor, or an intermediate processor, may be granted access to the memory on the RAC so that any files stored in the RAC are actually accessible by the main information handling system.

In other embodiments, the RAC may store received files or other information into a main system memory such as a hard disk drive, a floppy disk drive, random access memory, or the like. In these embodiments, the RAC may use direct memory access technology or any other suitable method of storing information to the system storage. By storing the file to system storage, the main processor of the information handling system will have access to the files received using the RAC processor.

The method proceeds from 320 to 330, where, in at least one embodiment, the files received by the RAC processor are installed onto the information handling system using the primary processor of the information handling system. In this way, the primary processor of the information handling system, which is generally responsible for running the operating system and similar software, can be used to install the software or other file updates received via the RAC processor, without having to be involved with the actual transfer of files from one information handling system to another.

Although the disclosed embodiments have been described in detail, it should be understood that various changes, substitutions and alterations can be made to the embodiments without departing from their spirit and scope.

What is claimed is:

1. A method for use with an information handling system, the method comprising:
    receiving operational communications at the information handling system using a primary communications controller;
    receiving, at a remote access controller, a file to be installed in the information handling; and
    storing the received file in a storage medium local to the information handling system;
    wherein receiving operational communications at the information handling system comprises receiving the operational communications over a first communications network; and
    wherein receiving, at the remote access controller, the file to be installed in the information handling system comprises receiving the file over a second communications network, different from the first communications network.

2. The method of claim 1, wherein the storing comprises storing the received files to a non-volatile storage medium.

3. The method of claim 1, wherein the storing comprises storing the received file to random access memory accessible to both a primary processor of the information handling system and the remote access controller.

4. The method of claim 1, further comprising:
    receiving operational communications under control of a first processor; and
    receiving, under control of a second processor, the file to be installed.

5. The method of claim 4, further comprising:
    installing the file under control of the first processor.

6. The method of claim 1, wherein the information handling system is configured as part of a computing cluster including a plurality of additional information handling systems, the method further comprising:
    transferring the file to the information handling system from one of the plurality of additional information handling systems included in the computing cluster.

7. An information handling system comprising:
    at least one processor;
    a first memory operably associated with said first processor;
    an operating system to be stored, at least temporarily, in said memory and executed by said at least one processor;
    a communications controller coupled to receive operational communications and to provide said operational communications for use by said first processor under control of said operating system; and
    a remote access controller coupled to receive, independent of said at least one processor, a file to be installed in said information handling system;
    wherein receiving operational communications at the communications controller comprises receiving the operational communications over a first communications network; and
    wherein receiving, at the remote access controller, the file to be installed in the information handling system comprises receiving the file over a second communications network, different from the first communications network.

8. The information handling system of claim 7, further comprising a storage medium accessible to the remote access controller and the at least one processor.

9. The information handling system of claim 8, wherein the storage medium comprises a non-volatile storage medium.

10. The information handling system of claim 8, wherein the storage medium comprises the first memory.

11. The information handling system of claim 7, wherein the first communications controller comprises a network controller coupled to a first communications network; and the remote access controller comprises a network controller coupled to a second communications network, different from the first communications network.

12. The information handling system of claim 7, further comprising:
installing the file under control of the operating system.

* * * * *